Aug. 13, 1968  G. PRAST ET AL  3,396,547
COLD TRANSPORT TO A REMOTE LOCATION WITH
SMALL TEMPERATURE DROP
Filed Oct. 7, 1966  3 Sheets-Sheet 1

INVENTORS
GIJSBERT PRAST
JOHAN A. RIETDIJK
BY
*Frank R. Trifari*
AGENT

United States Patent Office 3,396,547
Patented Aug. 13, 1968

3,396,547
COLD TRANSPORT TO A REMOTE LOCATION
WITH SMALL TEMPERATURE DROP
Gijsbert Prast and Johan Adriaan Rietdijk, Emmasingel,
Eindhoven, Netherlands, assignors to North American
Philips Co., Inc., New York, N.Y., a corporation of
Delaware
Filed Oct. 7, 1966, Ser. No. 585,055
Claims priority, application Netherlands, Oct. 9, 1965,
6513117
6 Claims. (Cl. 62—6)

ABSTRACT OF THE DISCLOSURE

Cold transportation from a cold source to a remotely located place to be cooled having a number of series-connected heat exchangers which are alternately in thermal contact with the source and the remote location. Thus, only a small flow of medium is necessary, and a comparatively small pump is required.

Figure 1:
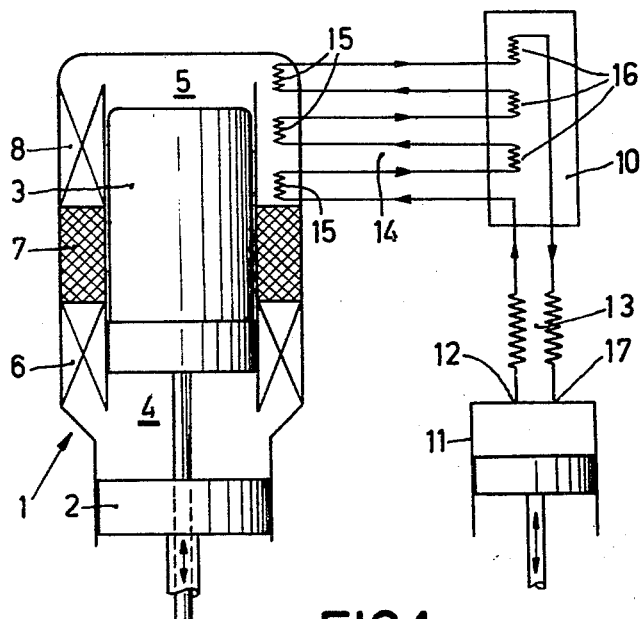

The invention relates to a device comprising a source of cold or heat, for example a cold-gas refrigerator or a nuclear reactor, and a duct system through which a medium can flow for conveying cold or heat respectively from the source to a place located remotely. The aforesaid duct system includes at least one heat exchanger in which the medium can exchange heat with the source, and at least one heat exchanger in which the medium can exchange heat with said remote location.

In a known system of the kind set forth, the duct system comprises only one heat exchanger in which the circulating medium exchanges heat with the source and one heat exchanger in which the medium exchanges heat with the remote location. In this kind of device the remote location is kept at a given temperature. The remote location may be formed by an electronic circuit arrangement which is cooled to a very low temperature. The efficiency of the source of cold becomes better when the temperature at which the cold is supplied becomes higher. This means that the temperature difference between the source of cold and the location to be cooled should be small, which invloves, however, that the temperature difference across the heat exchanger will be small. In order to convey a given quantity of cold from the cold source to the location to be cooled even under these conditions, a great stream of medium through the duct system is required. For maintaining this large flow of medium a large pump or ventilator is required, which is undesirable, if for structural reasons alone. This also applies to a source of heat, in which case it is also important that the temperature difference between the source and the location to be heated should be small.

A further disadvantage of the known device is that the ventilator or the pump give rise to a comparatively high loss of cold or heat respectively, since they are voluminous and since they have together the same temperature as the circulating medium. This loss plays an important role, especially in cold-producing systems operating at very low temperatures, for example, below 100° K.

The system according to the invention has for its object to overcome said disadvantages and is characterized in that the duct system communicates at one end with the outlet of a device capable of supplying medium of higher pressure at substantially the same temperature as that at which the source supplies its cold and heat respectively. The duct system includes a plurality of series-connected heat exchangers in which the medium is alternately in thermal contact with the source and the remote location, said duct system further communicating at its other end with an inlet of said device for supplying medium of higher pressure.

In the resultant system, the flow of medium is several times in thermal contact alternately with the source and the remote location. In this way a comparatively small flow of medium is capable of conveying the desired quantity of cold or heat respectively through the heat exchangers from the source to the remote location while the temperature difference is small. As the flow of medium is small, a comparatively small pump or ventilator may be sufficient, so that the loss is reduced and less pumping energy is required.

In a further advantageous embodiment of the device according to the invention, the device for supplying the medium of higher pressure is formed by a compression member, the inlet of which communicates through a heat exchanger with one end of the duct system, whereas the other end of the duct system communicates also through said heat exchanger with the inlet of the compressor.

In this system constructed in accordance with the invention, the compressor is capable of operating at the ambient temperature, which is extremely attractive both in view of the losses of cold or heat respectively and the seals. It is possible to construct this embodiment since the losses in the heat exchanger communicating with the compressor are slight due to the small flow of medium.

A further embodiment of the system comprises a source of cold, formed by a cold-gas refrigerator having one or more spaces of variable volume, communicating with one or more spaces also of variable volume, in which, in operation, a lower mean temperature prevails than in the first-mentioned space. Moreover, the link between each pair of said spaces includes at least one regenerator, through which a work medium can flow back and forth. According to the teaching of the present invention, this system is characterized in that the walls of said spaces of the cold-gas refrigerator are provided with at least one outlet and one inlet for the medium, the outlet communicating with one end and the inlet with the other end of the duct system.

In this system the cold-gas refrigerator thus forms both a source of cold and a supplier of the conveying medium. Only a small stream of medium need be derived from the refrigerator, whereas a substantial quantity of cold can be transferred through the heat exchanger at a small temperature difference. The operation of the cold-gas refrigerator is affected very little by the outlet and inlet of the small flow of medium.

The disposition of the outlet and inlet valves in the walls of the cold-gas refrigerator may be chosen arbitrarily. If the valves are provided in the wall of a space having a higher temperature than the source of cold with which the duct system cooperates, the medium must first be brought to said temperature in the heat exchanger. In order to avoid this, a further system embodying the invention is characterized in that the inlet and the outlet are both provided in the wall of the space in which, in operation, the lowest mean temperature prevails.

A further embodiment of the device according to the invention comprises a source of cold and a compression member, the outlet of which communicates with a first heat exchanger in which compressed medium can exchange heat with an expanded medium and which communicates with a second heat exchanger, in which the compressed medium can exchange heat further with expanded medium. The outlet of said heat exchanger communicates with an expansion space while at least part of the expanded medium can flow back through said heat exchanger to the suction side of the compressor. This system is characterized in that the duct system in which the heat exchangers for conveying cold from the source of cold to the remote location are included, communicates at one end with the outlet of compressed medium of one heat exchanger, whereas the other end communicates with the inlet of compressed medium of the other heat exchanger. In this way an extremely advantageous combination of a source of cold, a duct system with a medium for transferring cold and a compression-expansion system is obtained. The source of cold supplies cold both to the compression-expansion system and to the place to be cooled. The location to be cooled may be formed by a radiation screen surrounding the compression-expansion system and serving for reducing cold losses.

A further system embodying the invention comprises a plurality of cold sources of different temperatures, each of them cooperating with a duct system for transferring cold from the source concerned to a remote location. The system furthermore comprises a compression device, the inlet of which communicates with a plurality of series-connected heat exchangers in which the compressed medium can exchange heat with expanded medium and whereas the outlet of the last heat exchanger communicates with an expansion device while at least part of the expanded medium can flow back through said heat exchanger to the suction side of the compression member. This system is characterized in that between each pair of relatively communicating heat exchangers the outlet of compressed medium of one heat exchanger communicates with one end of the duct system, which cooperates with the source of cold operating at a temperature corresponding with the temperature at which the expanded medium leaves the other heat exchanger. The other side of said duct system communicates with the outlet for compressed medium of the other heat exchanger. In this system part of the cold supplied by the sources serves for cooling the medium circulating through the compression-expansion system. The other part of the cold produced is used for cooling various remote locations at different temperatures. These locations may be formed by radiation screens surrounding the coldest part of the compression-expansion system.

The invention will be described more fully with reference to the drawings in which:

FIG. 1 shows diagrammatically a system comprising a source of cold and a duct system with a medium for transferring cold to a remote location.

Figure 2:
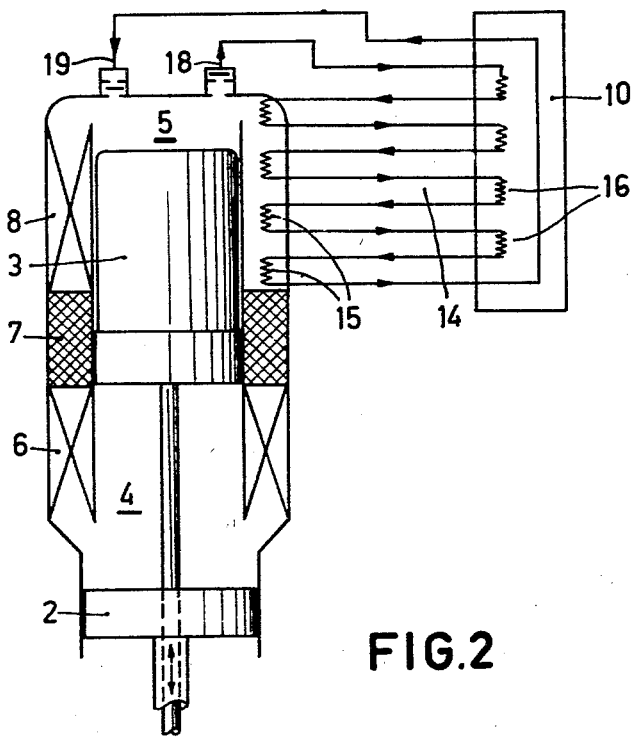
Figure 3:
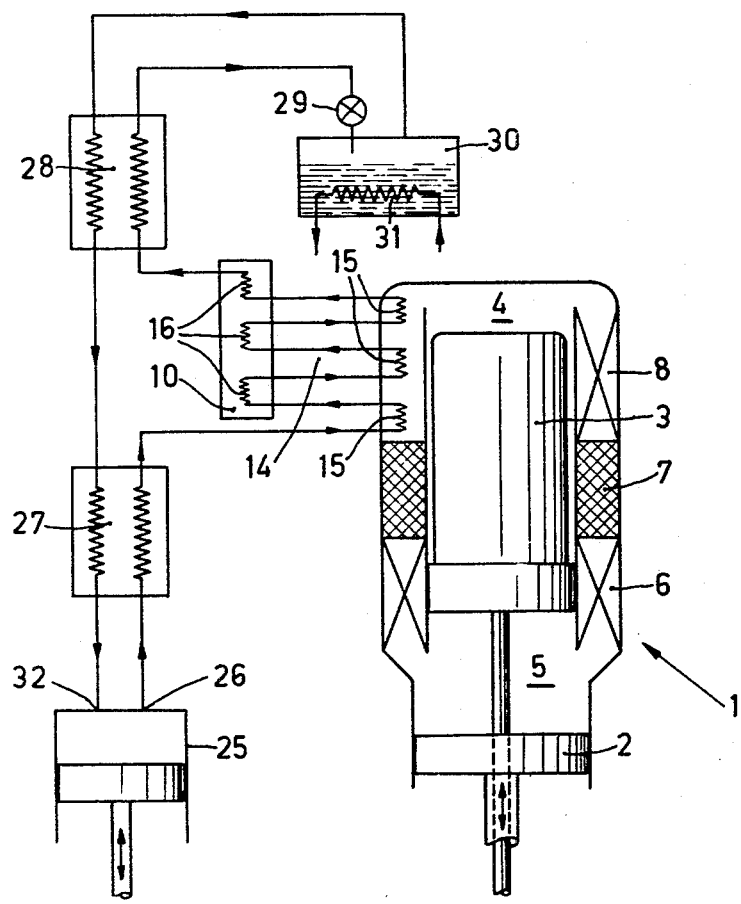
Figure 4:
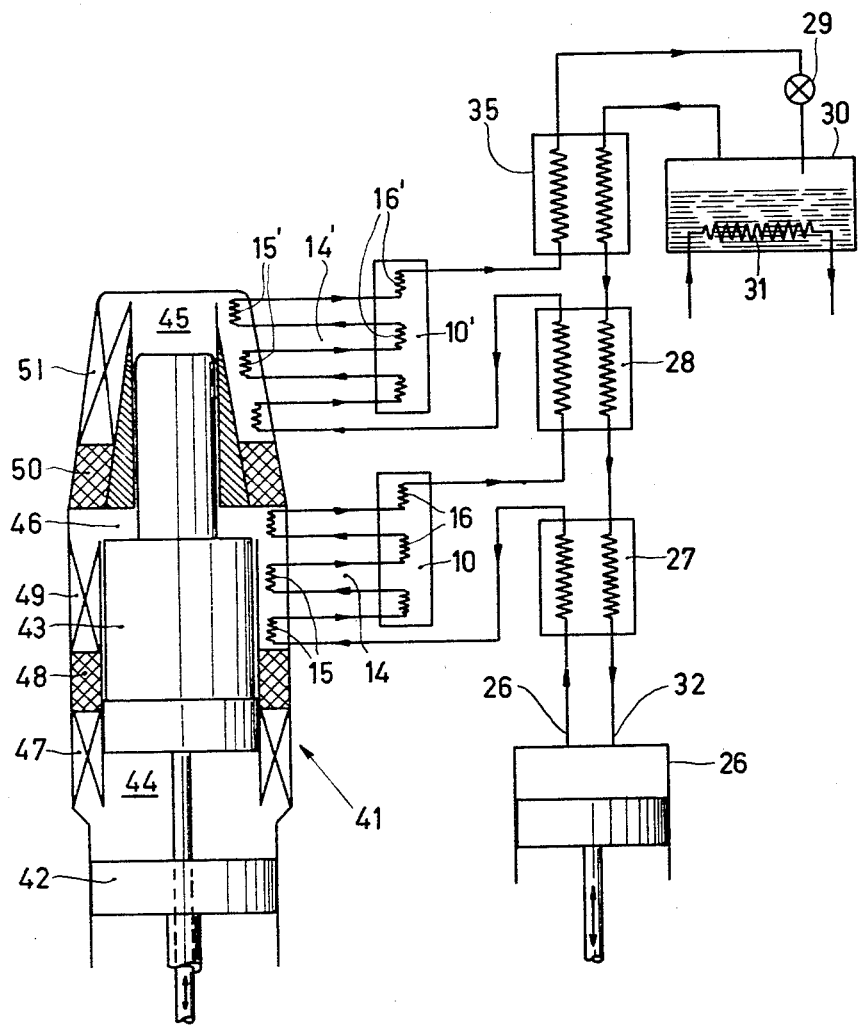

FIG. 2 shows diagrammatically a system comprising a cold-gas refrigerator having an inlet and an outlet valve, with which communicates a duct system for transferring heat from the refrigerator to a remote location and FIGS. 3 and 4 show diagrammatically two embodiments of systems having one and two sources of cold respectively and a Joule-Kelvin system and a duct system for each source of cold, including heat exchangers, and communicating with the Joule-Kelvin system.

Referring especially to FIG. 1, reference numeral 1 designates a cold-gas refrigerator, which comprises a piston 2 and a displacer piston 3, each connected with a driving gear (not shown), which is capable of moving the piston and the displacer with a relative phase difference. During this movement, the volumes of a compression space 4 and of an expansion space 5 are varied. The compression space 4 and the expansion space 5 communicate with each other through a cooler 6, a regenerator 7 and a freezer 8. The working space of the cold-gas refrigerator comprises a working medium which is contained during the expansion for the major part in the expansion space 5 where it supplies cold at a given low temperature. This cold has to be transferred to a remote location to be cooled. For this purpose there is provided a compressor 11, the outlet 12 of which communicates with a heat exchanger 13. The outlet for compressed, cooled medium of the heat exchanger 13 communicates with one end of a duct system 14. The duct system 14 includes a plurality of heat exchangers 15 and a plurality of heat exchangers 16, which are alternately connected in series. In the heat exchangers 15 the medium is in thermal contact with the freezer 8 whereas in the heat exchangers 16 the medium is in thermal contact with the location 10 to be cooled. The other end of the duct system communicates also through the heat exchanger 13 with the inlet 17 of the compressor.

In this system the compressor 11 operates at the ambient temperature which has many advantages. The flow of gas activated by the compressor need only be small. Therefore, also the dimensions may be small. Consequently, the flows through the heat exchanger 13 are also small, so that the losses of heat are low.

In spite of the small stream of medium a great quantity of cold can be transferred with a low temperature difference through the heat exchangers 15 and 16 from the source of cold to the location to be cooled. This is due to the fact that it is not the effective stream of medium passing through the duct system which is available for the transport of cold, but a stream is available which is several times greater, i.e. a number of times corresponding with the number of heat exchangers provided at the source of cold and the location to be cooled respectively. In the system shown in FIG. 1 there is available a three-times greater flow for the transport of cold. Therefore, the temperature difference may be low. Instead of using a cold-gas refrigerator, use may be made of other sources of cold in this system.

FIG. 2 shows a system comprising a cold-gas refrigerator 1. The components of this refrigerator are designated by the same reference numerals as in FIG. 1. The system comprises furthermore a duct system 14 in which a medium can flow for transferring cold from the freezer 8 to a location 10 to be cooled. The duct system 14 includes heat exchangers 15 and 16. In the heat exchanger 15 the medium can exchange heat with the freezer 8 and in the heat exchanger 16 the medium is in thermal contact wtih the location 10 to be cooled.

One end of the duct system 14 communicates with an outlet 18 in the wall of the expansion space 5 of the cold-gas refrigerator, and the other end the duct system 14 communicates with an inlet 19, also provided in the wall of the expansion space 5.

A small flow of medium passes per cycle from the cold-gas refrigerator through the outlet in the duct system where it is alternately in thermal contact in the heat exchanger 16 with the location to be cooled and in the heat exchanger 15 with the freezer 8. Therefore, a flow of medium several times greater (the number of times corresponds with the number of heat exchangers) conveys the cold from the cold-gas refrigerator to the location to be cooled. The temperature differences across the heat exchangers may therefore be comparatively small.

In this manner a system is obtained in which the cold source does not only supply cold but also passes medium for conveying cold through the duct system 14. The advantage of this system, apart from its compactness, is that only a small flow of medium need be circulated for conveying the cold across the heat exchangers without the need for a high temperature difference.

FIG. 3 shows a system comprising a cold-gas refrigerator 1, a duct system 14 and a Joule-Kelvin system. The cold-gas refrigerator 1 includes the same components as the refrigerator shown in FIG. 1, and the duct system 14 also has the same components as the system shown in FIG. 1.

The Joule-Kelvin system comprises a compressor 25, an outlet of which communicates with a first heat exchanger 27. The system comprises furthermore a second heat exchanger 28, the outlet of which for compressed cooled medium communicates with an expansion valve 29, which opens out in a container 30. The container 30 accommodates a cooling helix 31 in which a medium can be cooled by the expanded medium. The gaseous expanded medium can flow back through the heat exchangers 28 and 27 to the inlet 32 of the compressor 25.

The outlet of compressed medium of the heat exchanger 27 communicates with one end of the duct system 14, whereas the other end of the duct system 14 communicates with the inlet of compressed medium of the heat exchanger 28. In this way a system is obtained in which the medium of the Joule-Kelvin system also passes through the duct system 14. This medium is thus cooled while it transfers at the same time cold from the cold source to a location 10 to be cooled. The location 10 to be cooled may in this system be formed by a radiation screen which surrounds the cold portion of the Joule-Kelvin system. Since in the duct system 14 the medium is alternately in thermal contact with the freezer 8 and the location to be cooled a comparatively large quantity of cold can be transferred with a small temperature difference.

The expansion valve 29 in the Joule-Kelvin system may be replaced by an expansion member of another structure, and the cold-gas refrigerator may be replaced by a different source of cold.

FIG. 4 shows a system comprising a plurality of cold sources. These cold sources are formed by expansion spaces of a two-stage cold-gas refrigerator 41. This refrigerator comprises a piston 42 and a displacer 43 formed by two portions of different diameters. The piston 42 and the displacer 43 are connected with a driving gear (not shown), which can move the piston and the displacer with a relative phase difference. During this movement the volume of a compression space 44 and that of two expansion spaces 45 and 46 is varied. The compression space 44 communicates through a cooler 47, a regenerator 48 and a first freezer 49 with the expansion space 46. The expansion space 46 communicates through a regenerator 50 and a second freezer 51 with the expansion space 45. The expansion space 46 will have, in operation, a higher mean temperature than the expansion space 45. The system comprises two duct systems 14 and 14', which convey cold from the freezer 49 and 51 respectively to the locations 10 and 10' respectively to be cooled.

The system comprises, moreover, a Joule-Kelvin system formed by a compressor 25, the outlet 26 and the inlet 32 of which communicate with the heat exchangers 27, 28 and 35. The outlet of compressed medium of the heat exchanger 35 communicates with the expansion valve 29, which opens out in the container 30. The gaseous expanded medium of the container 30 can flow through the heat exchangers 35, 28 and 27 back to the inlet 32 of the compressor.

The outlet of compressed medium of the heat exchanger 27 communicates with one end of the duct system 14. The other end of this duct system communicates with the inlet of compressed medium of the heat exchanger 28. In the same manner the duct system 14' communicates at one end with the heat exchanger 28 and at the other end with the heat exchanger 35.

In this system the medium taking part in the Joule-Kelvin cycle is cooled at two different temperatures, that is to say, at the temperature of the freezer 49 and that of the frezer 51. Cold is conveyed in this system from the freezer 49 and 51 respectively to the locations 10 and 10' to be cooled respectively. The locations to be cooled may again be formed by two radiation screens surrounding the cold portion of the Joule-Kelvin system.

Although the figures are restricted to embodiments in which cold is transferred from a cold source to a location to be cooled, it will be obvious that the cold conveying system may also be employed for transferring heat from a source of heat to a place to be heated. Moreover, it will be obvious that the invention provides systems in which cold or heat is transferred in a very efficient manner from the source of cold or heat respectively to a remote location having a very uniform temperature.

What we claim is:

1. An apparatus for transferring cold or heat from a source to a space to be cooled or heated located remotely comprising a duct system having a medium therein flowing in a manner to conduct cold or heat from said source to said remote location, said duct system including at least one heat exchanger in which said medium can exchange heat with said source, and at least another heat exchanger in which said medium can exchange heat with said remote location, a device for supplying medium of higher pressure at substantially the same temperature as that at which said source supplies its cold or heat, said duct system communicating at one end with the outlet of said device, said duct system having a plurality of series-connected heat exchangers in which said medium is alternately in thermal contact with said source and said remote location, said duct system communicating at its other end with an inlet of said device supplying medium of higher pressure.

2. An apparatus as claimed in claim 1 wherein said device for supplying medium of higher pressure is a compressor, an additional heat exchanger connected between said compressor and said space to be cooled or heated, the outlet of said compressor communicating through said additional heat exchanger with one end of said duct system, the other end of said duct system communicating through said additional heat exchanger with the inlet of said compressor.

3. An apparatus for transferring cold to a remote space to be cooled as claimed in claim 1 wherein said source comprises a cold gas refrigerator having at least two spaces of different mean temperatures and of variable volume being interconnected with each other, said interconnection being provided with at least one regenerator through which said working medium traverses, one of said spaces in the cold gas refrigerator being provided with at least one outlet and at least one inlet for said medium, said outlet communicating with one end and the inlet communicating with said other end of said duct system.

4. An apparatus for transferring cold to a remote space to be cooled as claimed in claim 3 wherein the one of said spaces is the space which, in operation, the lower mean temperature prevails.

5. An apparatus for transferring cold to a remote space to be cooled as claimed in claim 3 further comprising a compressor having an outlet, an expansion member, a first and second heat exchanger and wherein said outlet communicates with a first heat exchanger, said compressed medium being in heat exchange with said expanded medium, a second heat exchanger in which said compressed medium additionally exchanges heat with said expanded medium, the outlet of said second heat exchanger communicating with said expansion member, at least part of said expanded medium flowing back through said heat exchangers to the suction side of said compressor, and a duct system provided with heat exchangers for transferring cold from the cold gas refrigerator to said remote location, said duct system communicating at one end thereof with the outlet of said compressed medium and at the other end thereof with the inlet of said compressed medium of another heat exchanger.

6. An apparatus for transferring cold to a remote space to be cooled as claimed in claim 3 further comprising a plurality of sources of cold at different mean temperatures, said cold sources co-acting with said duct system for transferring cold from said sources to a remote location, a compressor, a plurality of series-connected heat exchangers connected to the outlet of said heat exchangers in which compressed medium can exchange heat with the expanded medium, an expansion member, the outlet of the last series-connected heat exchanger communicating with said expansion member, at least part of said expanded medium flowing back through said heat exchangers to the suction side of said compression member, the outlet of compressed medium of one heat exchanger communicates with one end of said duct system between each pair of communicating heat exchangers, said one end of said duct system co-acting with a selected cold source, the latter supplying cold at a temperature which corresponds with the temperature at which the expanded medium leaves another heat exchanger, said duct system communicating at the other end with the inlet of compressed medium of the other heat exchanger.

References Cited

UNITED STATES PATENTS

| 2,764,877 | 10/1956 | Kohler | 62—6 |
| 3,101,596 | 8/1963 | Rinia et al. | 62—6 |
| 3,115,015 | 12/1963 | Hogan | 62—6 |
| 3,214,924 | 11/1965 | Van Gevns et al. | 62—6 |
| 3,260,055 | 7/1966 | Webb | 62—6 |

WILLIAM J. WYE, *Primary Examiner.*